United States Patent
Bach et al.

(10) Patent No.: US 10,804,556 B2
(45) Date of Patent: Oct. 13, 2020

(54) FUEL CELL STACK HAVING AN INTERNAL PARTICLE RETENTION FUNCTION AND VEHICLE HAVING SUCH A FUEL CELL STACK

(71) Applicants: VOLKSWAGEN AG, Wolfsburg (DE); AUDI AG, Ingolstadt (DE)

(72) Inventors: Peter Bach, Burnaby (CA); Ingo Drescher, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 236 days.

(21) Appl. No.: 15/751,803

(22) PCT Filed: Aug. 10, 2016

(86) PCT No.: PCT/EP2016/069024
§ 371 (c)(1),
(2) Date: Feb. 9, 2018

(87) PCT Pub. No.: WO2017/025556
PCT Pub. Date: Feb. 16, 2017

(65) Prior Publication Data
US 2018/0233757 A1 Aug. 16, 2018

(30) Foreign Application Priority Data
Aug. 10, 2015 (DE) .................. 10 2015 215 201

(51) Int. Cl.
*H01M 8/0662* (2016.01)
*H01M 8/04044* (2016.01)
(Continued)

(52) U.S. Cl.
CPC ..... *H01M 8/0662* (2013.01); *H01M 8/04044* (2013.01); *H01M 8/1018* (2013.01);
(Continued)

(58) Field of Classification Search
CPC .......... H01M 8/04044; H01M 8/0662; H01M 8/2457; H01M 8/2483; H01M 8/1018
(Continued)

(56) References Cited

U.S. PATENT DOCUMENTS 3,849,202 A * 11/1974 Pompon ................ H01M 8/225
29/623.2
6,794,068 B2 9/2004 Rapaport et al.
(Continued)

FOREIGN PATENT DOCUMENTS

CN 1773760 A 5/2006
DE 103 93 165 T5 1/2006
(Continued)

OTHER PUBLICATIONS

Machine translation of WO 2015/110545 (no date).*

*Primary Examiner* — Amanda C. Walke
(74) *Attorney, Agent, or Firm* — Seed Intellectual Property Law Group LLP

(57) ABSTRACT

The invention relates to a fuel cell stack, a fuel cell system, and a vehicle having such a fuel cell system. The fuel cell stack comprises a stack of membrane electrode assemblies and bipolar plates arranged in alternation between two end plates and comprises main supply channels for supplying and discharging operating media for the fuel cell stack which main supply channels extend through the stack in the stacking direction of the stack. It is provided that means for retaining particles be provided in at least one of the main supply channels.

9 Claims, 4 Drawing Sheets

Figure 1:
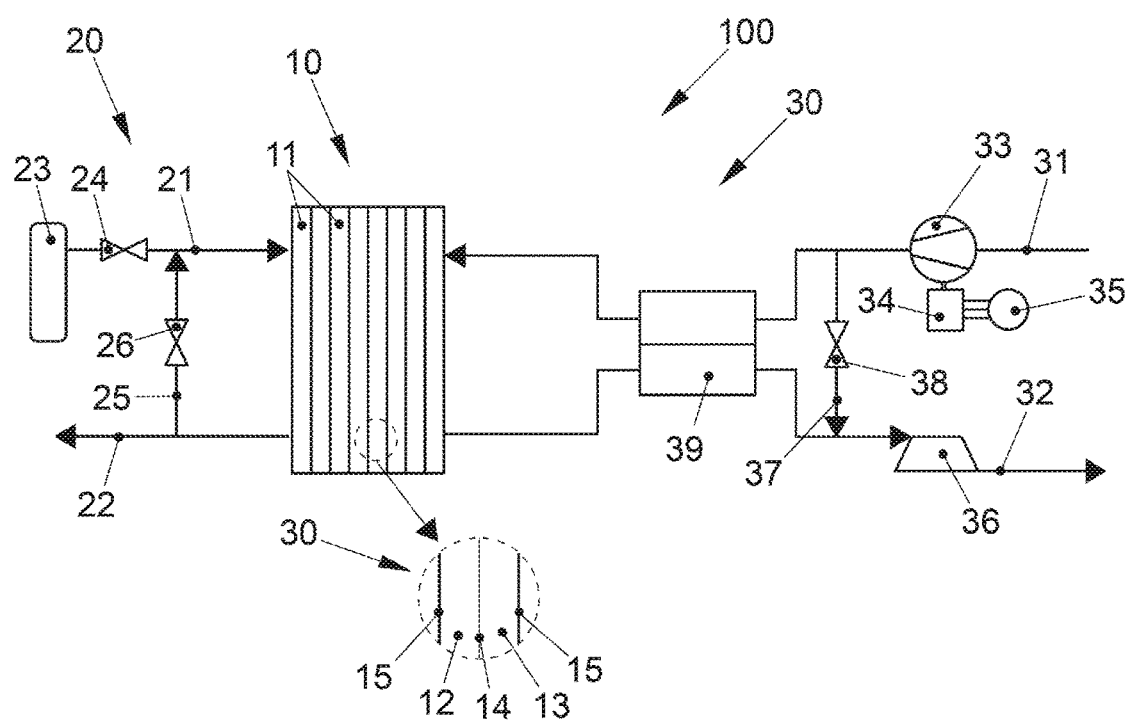

(51) Int. Cl.
*H01M 8/2483* (2016.01)
*H01M 8/2457* (2016.01)
*H01M 8/1018* (2016.01)

(52) U.S. Cl.
CPC ....... *H01M 8/2457* (2016.02); *H01M 8/2483* (2016.02); *H01M 2008/1095* (2013.01); *H01M 2250/20* (2013.01); *Y02T 90/32* (2013.01)

(58) Field of Classification Search
USPC .......................................................... 429/410
See application file for complete search history.

(56) References Cited

U.S. PATENT DOCUMENTS

| | | | |
|---|---|---|---|
| 8,808,932 B2 | 8/2014 | Baika | |
| 9,546,426 B2 * | 1/2017 | Logan | .................. C25B 1/02 |
| 2011/0305965 A1 | 12/2011 | Lee et al. | |
| 2013/0337368 A1 * | 12/2013 | Doyen | ..................... C25B 1/12 |
| | | | 429/509 |
| 2015/0004502 A1 | 1/2015 | Ikeya et al. | |
| 2015/0318562 A1 | 11/2015 | Hausmann et al. | |
| 2017/0062864 A1 * | 3/2017 | Ohmori | ................ H01M 8/2428 |
| 2017/0084940 A1 * | 3/2017 | Kawabata | ......... H01M 8/04089 |
| 2017/0301940 A1 * | 10/2017 | Hill | ......................... C01B 3/384 |
| 2018/0048012 A1 * | 2/2018 | Beutel | ................... H01M 8/023 |
| 2018/0212294 A1 * | 7/2018 | Smedley | ............... H01M 12/06 |

FOREIGN PATENT DOCUMENTS

| | | | |
|---|---|---|---|
| DE | 10 2012 020 294 A1 | | 4/2014 |
| EP | 2 159 865 A1 | | 3/2010 |
| EP | 1 349 638 B1 | | 4/2010 |
| JP | 2006-228507 A | | 8/2006 |
| JP | 2011-009137 A | | 1/2011 |
| JP | 2019129019 A | * | 8/2019 |
| KR | 10-2010-0111972 A | | 10/2010 |
| WO | 2008/055343 A1 | | 5/2008 |
| WO | 2010/033628 A1 | | 3/2010 |
| WO | WO-2015110545 A1 | * | 7/2015 |

* cited by examiner

FUEL CELL STACK HAVING AN INTERNAL PARTICLE RETENTION FUNCTION AND VEHICLE HAVING SUCH A FUEL CELL STACK

The invention relates to a fuel cell stack with internal particle retention function and to a fuel cell system having such a stack. The invention further relates to a vehicle having such a fuel cell system or such a fuel cell stack.

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (usually proton-conducting) membrane and of a catalytic electrode (anode and cathode) respectively arranged on both sides of the membrane. The electrodes generally comprise supported precious metals—in particular, platinum. In addition, gas diffusion layers (GDL) can be arranged on both sides of the membrane electrode assembly on the sides of the electrodes facing away from the membrane. Generally, the fuel cell is formed by a plurality of MEA's arranged in the stack, the electrical power outputs of which add up. Between the individual membrane electrode assemblies, bipolar plates (also called flow field plates or separator plates) are usually arranged, which ensure a supply of the individual cells with the operating media, i.e., the reactants, and are usually also used for cooling. In addition, the bipolar plates ensure an electrically conductive contact to the membrane electrode assemblies.

During operation of the fuel cell, the fuel (anode operating medium)—particularly, hydrogen $H_2$ or a gas mixture containing hydrogen—is supplied to the anode via an open flow field of the bipolar plate on the anode side, where an electrochemical oxidation of $H_2$ to protons $H^+$ with loss of electrons takes place ($H_2 \rightarrow 2\ H^+ + 2\ e^-$). A (water-bound or water-free) transport of the protons from the anode chamber into the cathode chamber takes place via the electrolyte or the membrane, which separates the reaction spaces from each other in a gas-tight manner and electrically insulates them. The electrons provided at the anode are guided to the cathode via an electrical line. The cathode receives, as cathode operating medium, oxygen or a gas mixture containing oxygen (such as air) via an open flow field of the bipolar plate on the cathode side, so that a reduction of $O_2$ to $2\ O^{2-}$ with gain of electrons takes place (½ $O_2 + 2\ e^- \rightarrow O^{2-}$). At the same time, the oxygen anions react in the cathode chamber with the protons transported across the membrane to form water ($O^{2-} + 2\ H^+ \rightarrow H_2O$).

The fuel cell stack is supplied with its operating media, i.e., the anode operating gas (hydrogen, for example), the cathode operating gas (air, for example), and the coolant, by means of the main supply channels, which run through the stack in its entire stacking direction and from which the operating media are supplied to the individual cells via the bipolar plates. There are at least two such main supply channels available for each operating medium—namely, one for supplying and one for discharging the respective operating medium.

During operation of the fuel cell stack, particulate contaminations of the operating media can result in the particulate contaminations accumulating (sedimenting) in the main supply channels of the stack and in obstructions and blockages of the fine channel structures branching off of the main supply channels into the individual cells. This problem occurs, in particular, at the flow end of the main supply channels. Over time, this can result in a reduction of the power output or even in permanent damage to the stack.

In order to protect fuel cell stacks against particulate contaminations, e.g., against the dust contained in air, it is known to integrate external filters in the respective supply paths of the fuel cell system (for example, EP1349638B1, EP2159865A1, U.S. Pat. No. 8,808,932B2, US2015004502A1). However, such filter devices occupy a comparatively large installation space and constitute increased weight.

The invention is now based upon the aim of proposing a fuel cell system that allows for a more compact and weight-reduced design and at the same time protects the fuel cell stack against particulate contaminations of the operating media.

This aim is achieved by a fuel cell stack, a fuel cell system having such a fuel cell stack, and a vehicle having such a fuel cell system with the features of the independent claims.

The fuel cell stack according to the invention comprises a stack of membrane electrode assemblies and bipolar plates arranged in alternation, as well as two end plates between which the stack is arranged. The stack further comprises main supply channels for supplying and discharging operating media for the fuel cell stack, which main supply channels extend through the stack in the stacking direction of the stack. According to the invention, means for retaining particles are provided in at least one of the main supply channels.

By arranging means for retaining particles in at least one of the main supply channels, i.e., within a fuel cell stack, the requirement for a separate component for purifying the respective operating medium is eliminated. In this way, the complexity of the fuel cell system and the installation space requirement are reduced. At the same time, weight is saved, which is, in particular, advantageous in mobile uses of the fuel cell system. The particle separation effectiveness can, moreover, even be improved.

In this respect, "means for retaining particles" within the scope of the present invention refers to any design or arrangement that is suitable for preventing, in a targeted manner, particles, i.e., solid contaminations of the operating media, from being transported further, and for collecting them. In the process, the means for retaining particles are preferably designed such that the particles accumulate at predefined points in the area of the respective main supply channel in a targeted manner.

The fuel cell stack preferably comprises at least six main supply channels, viz., a channel for supplying the anode operating medium (hereinafter, anode inlet channel), a channel for discharging the anode exhaust gas (anode outlet channel), a channel for supplying the cathode operating medium (cathode inlet channel), a channel for discharging the cathode exhaust gas (cathode outlet channel), a channel for supplying the coolant (coolant inlet channel), and a channel for discharging the coolant (coolant outlet channel). Each of these main supply channels extends through the stack formed by membrane electrode assemblies and bipolar plates in the stacking direction of the stack, i.e., orthogonally to the extension of the individual cells.

In a preferred embodiment of the invention, the means for retaining particles are arranged in at least one of the main supply channels for supplying operating media, i.e., the anode inlet channel, the cathode inlet channel, and/or the coolant inlet channel. On the one hand, this prevents particulate contaminations of the respective operating medium from entering into the individual cells of the fuel cell stack or from sedimenting in the main supply channel and causing blockages there. In this way, a separate purification device for the respective operating medium, e.g., a particle filter, may be eliminated, or at least dimensioned to be smaller. Particularly preferably, the means for retaining particles are arranged in the cathode inlet channel and/or in the coolant inlet channel. The cathode inlet channel is affected particularly by particulate deposits, since air is usually used as the cathode operating medium, which is aspirated from the environment and can thus have the most varied particulate contaminations. On the other hand, with increasing service life, the usually circulating coolant can also be affected by particulate contaminations.

The means for retaining particles are preferably provided in an end section (in relation to the flow direction of the respective operating medium) of the at least one main supply channel—in particular, in a section of the channel from which no supply channels to the individual fuel cells branch off. This causes the particles that are too large for flowing into the individual cells to be retained and accumulated in a targeted manner at the end section, so that they do not result in a blockage of the individual cells there.

The means for retaining particles can, in particular, be provided or formed in a downstream end plate of the fuel cell stack. In this way, the retained particles accumulate in or at the downstream end plate, where they do not result in any blockage of the individual cells and do not impede the fluid flow of the operating medium.

In a preferred embodiment of the invention, the fuel cell stack is designed to be operated in an installation location in which the main supply channels for supplying and discharging the operating media run substantially horizontally ("recumbently"). In this case, the at least one main supply channel having the means for retaining particles is arranged below or laterally adjacent to an inlet area of the active areas of the membrane electrode assemblies, said inlet area communicating (fluidically) with this main supply channel. The active areas run vertically, in the case of the subjacent arrangement of the respective main supply channel, or horizontally, in the lateral arrangement. In this respect, the terms "subjacent" or "laterally adjacent" refer to the relative arrangement in the gravitational field. This design achieves that the retained particles accumulate, as a result of gravity, on a side of the respective main supply channel that is subjacent in the installation location and are separated from the operating medium flowing into the individual cells and into the active areas from above or laterally. In this design, the means for retaining particles are particularly preferably arranged in or on a section, arranged at the bottom, of the main supply channel.

In a preferred embodiment of the invention, the means for retaining particles have at least one cavity for receiving the particles. As explained below, this cavity may be designed, for example, as a radial (lateral) recess of the main supply channel or as receiving areas formed between two protrusions projecting into the main supply channel. The arrangement of such a cavity has the advantage of forming a reservoir in which the particles can be collected reliably and permanently, without being carried away again by the flow of the operating medium.

In another preferred embodiment of the invention, the means for retaining particles comprise, in the main supply channel and/or in the downstream end plate of the same, at least one recess arranged radially with respect to the extension of the main supply channel. In this embodiment, the aforementioned cavity is thus realized as a lateral recess. Particles can accumulate in such a lateral recess of the flow channel or of the end plate, without impeding the passing flow of the operating medium. Particularly if the radial recess is provided in the downstream end plate, no supplies to the individual cells are impeded at this location.

According to another advantageous embodiment of the invention, the means for retaining the particles comprise at least one protrusion projecting into the main supply channel—in particular, a plurality of such protrusions. The protrusion results in a deceleration of the particles, so that they accumulate in the channel upstream of the protrusion. If several protrusions are provided, a cavity, in which the particles can accumulate, is respectively formed between two neighboring protrusions. In the process, the particles accumulated there are mostly protected against the operating medium flow flowing toward them.

The at least one protrusion projecting into the main supply channel is preferably formed by a section, projecting into the main supply channel, of the membrane electrode assembly or of the bipolar plate. Both the membrane electrode assemblies and the bipolar plates have supply openings, which are mostly flush with each other in the stacked state and thus form the main supply channels. Because the respective supply opening of the membrane electrode assembly has a different size from that of the bipolar plate, the protrusions according to the invention are formed. In this way, a cavity receiving the particles (in this case, formed between two protrusions) can be obtained by means of minor structural changes.

If the protrusions are formed by the membrane electrode assemblies, it is preferably provided that the projecting section be formed by a support film or seal of the membrane electrode assemblies.

A further aspect of the invention relates to a fuel cell system having a fuel cell stack according to the invention. In addition to the fuel cell stack, the fuel cell system, in particular, has an anode supply and a cathode supply, with corresponding peripheral components.

Another aspect of the invention relates to a vehicle having a fuel cell system with a fuel cell stack according to the invention. The vehicle is preferably an electric vehicle in which electrical energy generated by the fuel cell system serves to supply an electric traction motor and/or a traction battery.

Additional preferred embodiments of the invention arise from the remaining features mentioned in the dependent claims.

The various embodiments of the invention mentioned in this application may be combined advantageously with one another, unless stated otherwise in individual cases.

Figure 2:
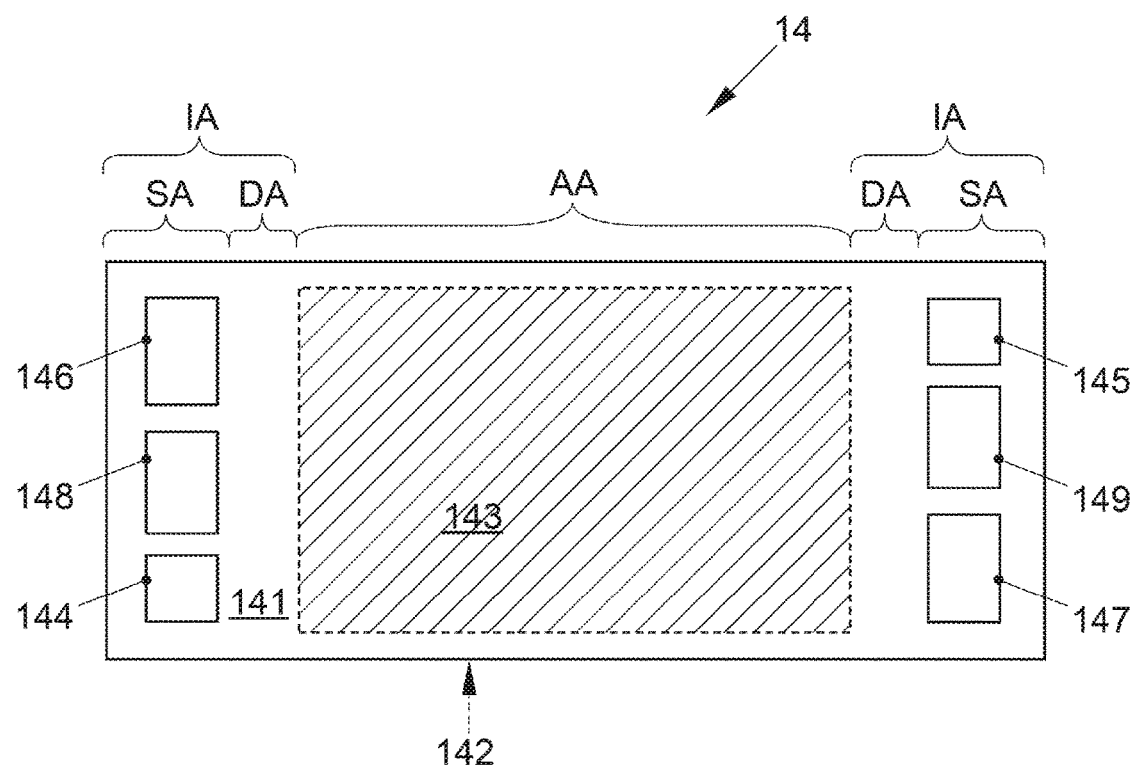
Figure 3:
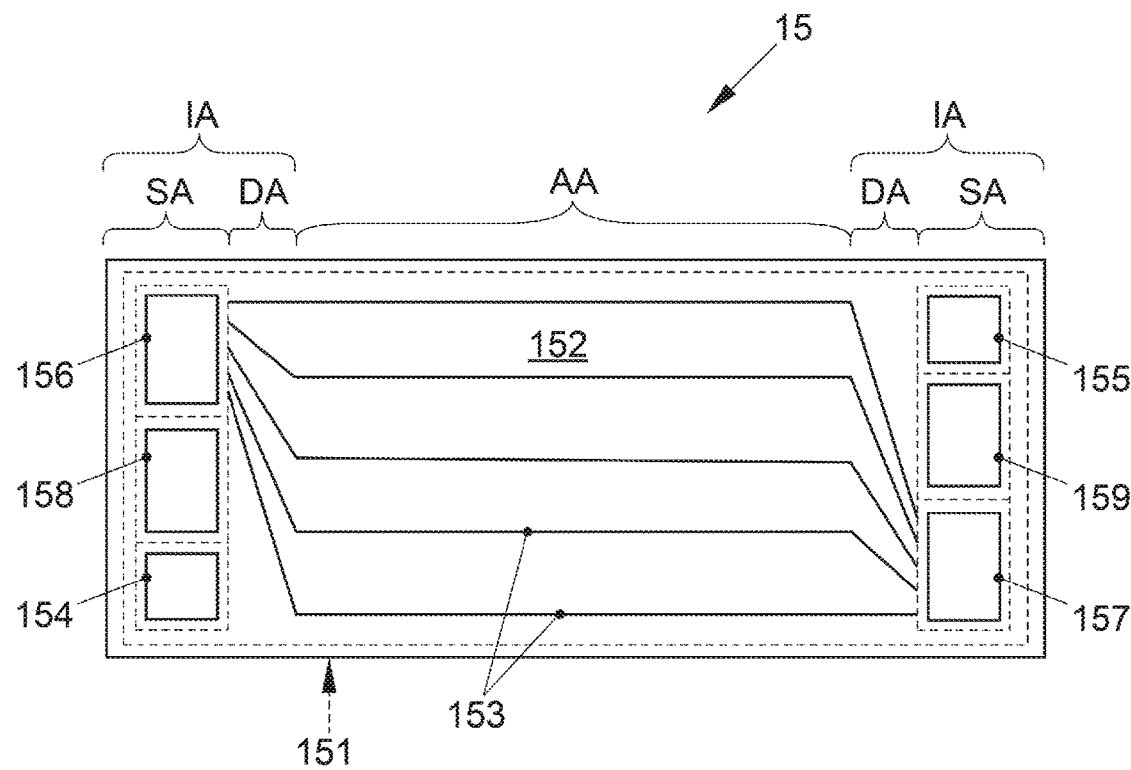
Figure 4:
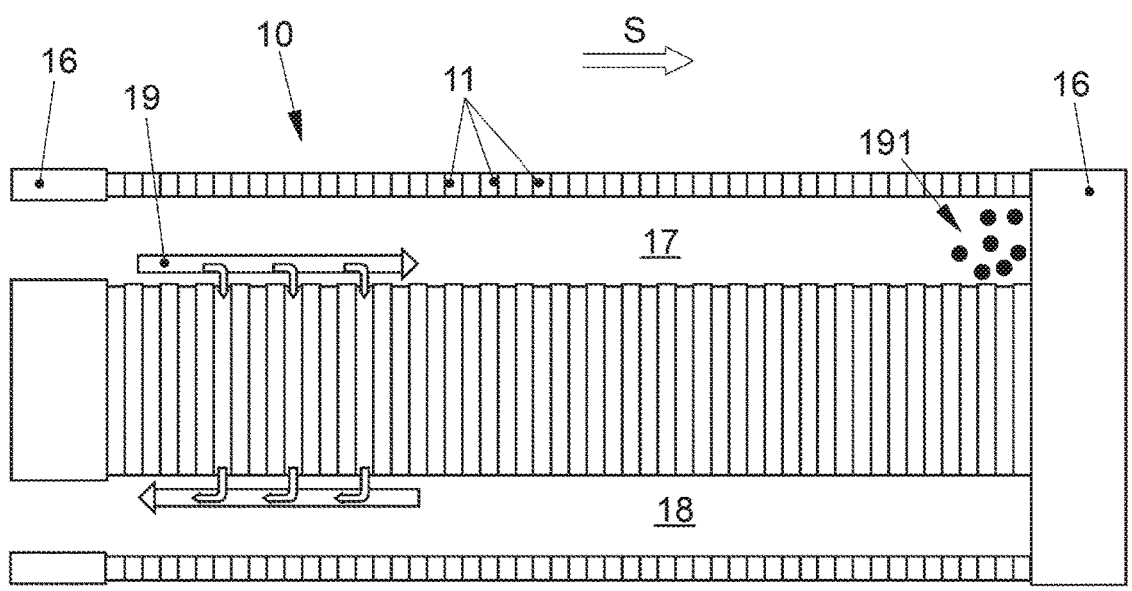
Figure 5:
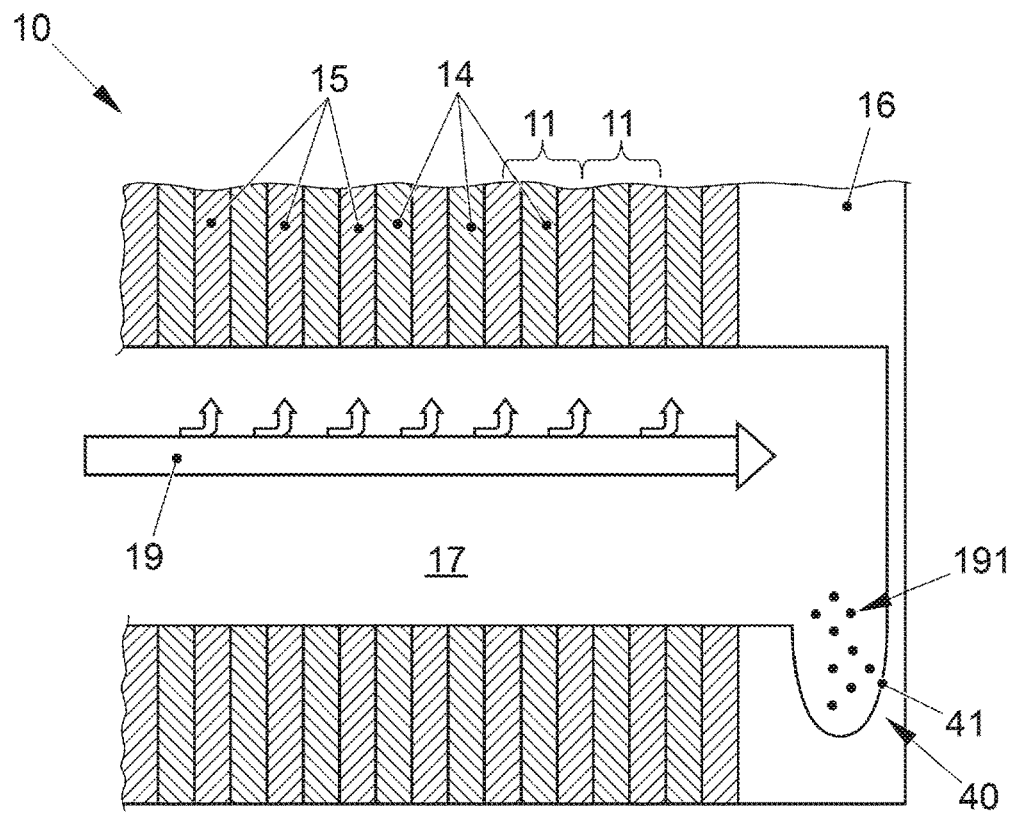
Figure 6:
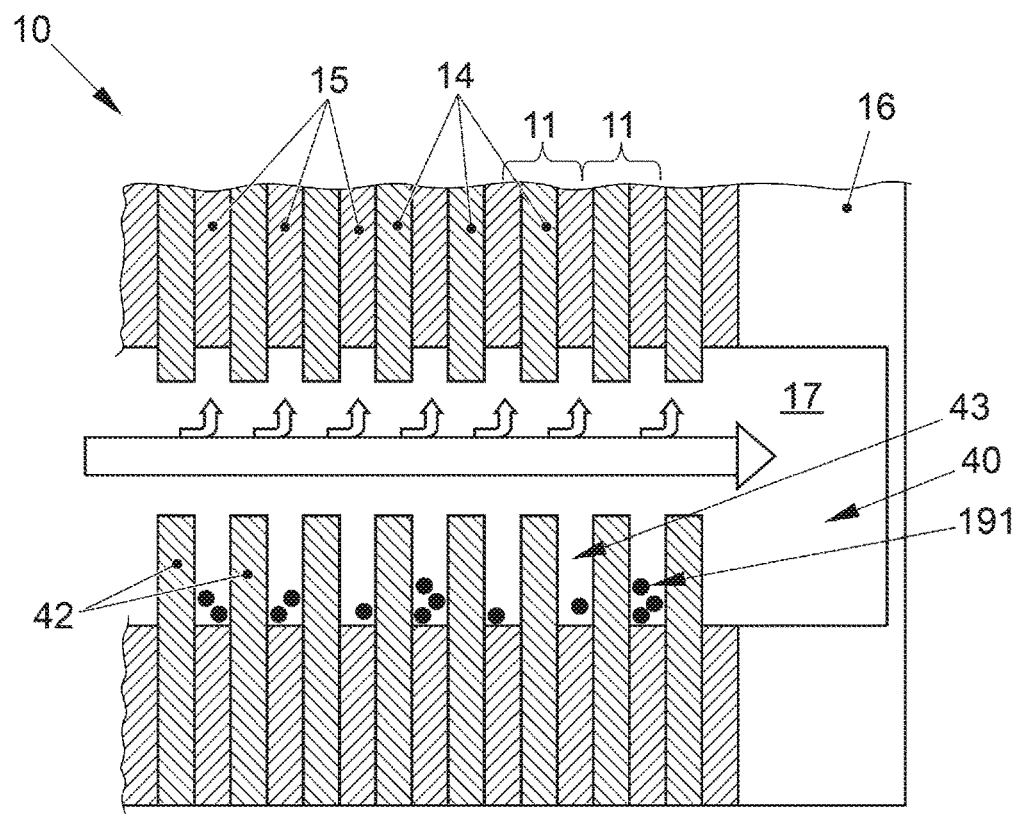

The invention is explained below in exemplary embodiments with reference to the associated drawings. The following is shown:

FIG. 1 a block diagram of a fuel cell system according to a preferred embodiment;

FIG. 2 a top view of a membrane electrode assembly;

FIG. 3 a top view of a bipolar plate;

FIG. 4 a sectional view of a fuel cell stack according to the prior art;

FIG. 5 a sectional view of a section of a fuel cell stack according to a first embodiment of the invention; and FIG. 6 a sectional view of a section of a fuel cell stack according to a second embodiment of the invention.

FIG. 1 shows a fuel cell system, denoted overall by 100, according to a preferred embodiment of the present invention. The fuel cell system 100 is part of a vehicle (not shown)—in particular, an electric vehicle—which has an electric traction motor, which is supplied with electrical energy by the fuel cell system 100.

The fuel cell system 100 comprises as core component a fuel cell stack 10, which has a plurality of individual cells 11, which are arranged in the form of a stack and which are formed by alternately stacked membrane electrode assemblies (MEA's) 14 and bipolar plates 15 (see detailed view). Each individual cell 11 thus respectively comprises an MEA 14 which has an ionically conductive polymer electrolyte membrane (not shown in detail), as well as catalytic electrodes arranged on both sides thereof, viz., an anode and a cathode, which catalyze the respective partial reaction of the fuel cell reaction and may, in particular, be designed as coatings on the membrane. The anode and cathode electrodes have a catalytic material, e.g., platinum, which is provided and supported on an electrically conductive support material with a large specific surface—for example, a carbon-based material. An anode chamber 12 between a bipolar plate 15 and the anode, and the cathode chamber 13 between the cathode and the next bipolar plate 15, are thus formed. The bipolar plates 15 serve to supply the operating media to the anode and cathode chambers 12, 13 and also establish the electrical connection between the individual fuel cells 11. Optionally, gas diffusion layers can be arranged between the membrane electrode assemblies 14 and the bipolar plates 15.

In order to supply the fuel cell stack 10 with the operating media, the fuel cell system 100 comprises, on the one hand, an anode supply 20 and, on the other, a cathode supply 30.

The anode supply 20 comprises an anode supply path 21, which serves to supply an anode operating medium (fuel), e.g., hydrogen, to the anode chambers 12 of the fuel cell stack 10. For this purpose, the anode supply path 21 connects a fuel reservoir 23 to an anode inlet of the fuel cell stack 10. The anode supply 20 also comprises an anode exhaust path 22 which discharges the anode exhaust gas from the anode chambers 12 via an anode outlet of the fuel cell stack 10. The anode operating pressure on the anode sides 12 of the fuel cell stack 10 is adjustable via an adjusting means 24 in the anode supply path 21. The anode supply 20 may additionally have a fuel recirculation line 25 which connects the anode exhaust path 22 to the anode supply path 21, as shown. The recirculation of fuel is customary, in order to return the mostly over-stoichiometrically supplied fuel to the stack and to use it. An additional adjusting means 26, with which the recirculation rate can be adjusted, is arranged in the fuel recirculation line 25.

The cathode supply 30 comprises a cathode supply path 31 which supplies an oxygen-containing cathode operating medium to the cathode chambers 13 of the fuel cell stack 10—in particular, air which is aspirated from the environment. The cathode supply 30 also comprises a cathode exhaust path 32, which discharges the cathode exhaust gas (in particular, the exhaust air) from the cathode chambers 13 of the fuel cell stack 10 and supplies it, if appropriate, to an exhaust system (not shown). A compressor 33 is arranged in the cathode supply path 31 for conveying and compressing the cathode operating medium. In the embodiment shown, the compressor 33 is designed as a compressor which is driven mainly by an electric motor, the drive of said compressor being effected via an electric motor 34 equipped with a corresponding power electronics system 35. The compressor 33 may also be driven by a turbine 36 (optionally, with variable turbine geometry) disposed in the cathode exhaust path 32 via a common shaft (not shown). The turbine 36 constitutes an expander, which brings about an expansion of the cathode exhaust gas and thus a reduction in its pressure.

In accordance with the illustrated embodiment, the cathode supply 30 can also have a wastegate line 37 which connects the cathode supply line 31 to the cathode exhaust line 32, i.e., constitutes a bypass of the fuel cell stack 10. The wastegate line 37 allows the reduction in the operating pressure of the cathode operating medium in the fuel cell stack 10 for a short period of time, without shutting down the compressor 33. An adjusting means 38 arranged in the wastegate line 37 allows for controlling the amount of the cathode operating medium bypassing the fuel cell stack 10. All adjusting means 24, 26, 38 of the fuel cell system 100 can be designed as regulable or non-regulable valves or flaps. Corresponding additional adjusting means may be arranged in the lines 21, 22, 31, and 32 in order to be able to isolate the fuel cell stack 10 from the environment.

The fuel cell system 100 may further have a humidifier module 39. The humidifier module 39 is, on the one hand, arranged in the cathode supply path 31 such that the cathode operating gas can flow through it. On the other hand, it is arranged in the cathode exhaust path 32 such that the cathode exhaust gas can flow through it. The humidifier 39 typically has a plurality of water vapor-permeable membranes, which are designed to be either flat or in the form of hollow fibers. In this case, the comparatively dry cathode operating gas (air) flows over one side of the membranes, and the comparatively moist cathode exhaust gas (exhaust gas) flows over the other side. Driven by the higher partial pressure of the water vapor in the cathode exhaust gas, water vapors pass over the membrane into the cathode operating gas, which is humidified in this way.

Various further details of the anode and cathode supply 20, 30 are not shown in the simplified FIG. 1, for reasons of clarity. For example, a water separator can be installed in the anode and/or cathode exhaust path 22, 32 in order to condense and drain product water arising from the fuel cell reaction. Finally, the anode exhaust gas line 22 can merge into the cathode exhaust gas line 32 so that the anode exhaust gas and the cathode exhaust gas are discharged via a common exhaust gas system.

In order to clarify the internal structure of the fuel cell stack 10, FIGS. 2 and 3 respectively show an exemplary membrane electrode assembly 14 and bipolar plate 15 in a top view.

Both components are divided into an active area AA and an inactive area IA. The active area AA is characterized by the fuel cell reactions taking place in this area. To this end, the membrane electrode assembly 14 has a catalytic electrode 143 in the active area AA on both sides of the polymer electrolyte membrane. The inactive areas IA can, respectively, be divided into supply areas SA and distributor areas DA. Within the supply areas SA, supply openings 144 through 147 are arranged on the side of the membrane electrode assembly 14, or supply openings 154 through 159 on the side of the bipolar plate 15, which are substantially flush with each other in the stacked state and form main supply channels in the fuel cell stack. The anode inlet openings 144 or 154 serve to supply the anode operating gas, i.e., the fuel—for example, hydrogen. The anode outlet openings 145 or 155 serve to discharge the anode exhaust gas after flowing over the active area AA. The cathode inlet openings 146 or 156 serve to supply the cathode operating gas, which is, in particular, oxygen or an oxygen-containing mixture—preferably, air. The cathode outlet openings 147 or 157 serve to discharge the cathode exhaust gas after flowing over the active area AA. The coolant inlet openings 148 or 158 serve to supply the coolant, and the coolant outlet openings 149 or 159 serve to discharge the coolant.

The MEA 14 has an anode side 141 that can be seen in FIG. 2. The illustrated catalytic electrode 143 is thus formed as an anode, e.g., as a coating on the polymer electrolyte membrane. The cathode side 142, which is not visible in FIG. 2, has a corresponding catalytic electrode—in this case, the cathode. The polymer electrolyte membrane may extend over the entire extent of the membrane electrode assembly 14, but at least over the active area AA. In the inactive areas IA, a reinforced support film, which encases the membrane, may be arranged.

The bipolar plate 15 shown in FIG. 3 also has a cathode side 152, visible in the illustration, and a non-visible anode side 151. In typical embodiments, the bipolar plate 15 consists of two joined plate halves—the anode plate and the cathode plate. On the cathode side 152 illustrated, operating medium channels 153 are formed as open, groove-like channel structures, which connect the cathode inlet opening 156 to the cathode outlet opening 157. Shown are only five exemplary operating medium channels 153, wherein, usually, a substantially higher number is provided. Likewise, the anode side 151 (not visible here) has corresponding operating medium channels, which connect the anode inlet opening 154 to the anode outlet opening 155. These operating medium channels for the anode operating medium are also designed as open, groove-like channel structures. Inside the bipolar plate 15—in particular, between the two plate halves—encased coolant channels run, which connect the coolant inlet opening 158 to the coolant outlet opening 151. The dashed lines in FIG. 3 indicate seals.

FIG. 4 shows a sectional view of a fuel cell stack 10 according to the prior art. As can be seen, the fuel cell stack 10 has a plurality of stacked individual cells 11, which are formed by alternately stacked membrane electrode assemblies 14 and bipolar plates 15. The individual cells 11 are pressed together and held together, sealed in a fluid-tight manner, by two end plates 16. To this end, they can be clamped together via clamping devices (not shown). In the representation according to FIG. 4, the left end plate 16 is formed as a media supply plate in that it has corresponding connections for the supply and discharge lines of the various operating media. The left end plate 16, toward which the operating medium flows, is subsequently also called downstream end plate 16. FIG. 4 further shows by way of example a main supply channel 17 for supplying an operating medium 19 for the fuel cell stack 10, as well as a main supply channel 18 for discharging the operating medium. The operating medium 19 thus enters through a corresponding connection of the media supply plate 16 shown on the left into the main supply channel 17 and flows through it. From there, it is distributed to the individual cells 11 of the stack. After flowing over the catalytic areas of the membrane electrode assembly 14 of the individual cells 11, the operating medium 19 flows from the individual cells 11 as exhaust gas into the main supply channel 18, from where it is discharged from the stack 10 via the end plate 16. The main supply channel 17 is, for example, a cathode inlet channel, which is formed by the cathode inlet openings 146, 156 of the membrane electrode assemblies 14 and the bipolar plates 15, said cathode inlet openings being stacked on top of each other (see FIGS. 2 and 3). The main supply channel 18 is, accordingly, a cathode outlet channel, which is formed by the cathode outlet openings 147, 157 of the MEA 14 and the bipolar plate 15, said cathode outlet openings being stacked on top of each other. In this case, the operating medium 19 is, in particular, air. If the operating medium 19 now contains particulate contaminations 191 that are too large to enter into the individual cells 11, a sedimentation and accumulation of the particles 191 takes place in the main supply channel 17. The particles 191, in particular, deposit as sediment in a downstream end of the channel 17. This can result in a blockage of the fine channel structures of the respective individual cells 11 and thus to power losses and undesired pressure drops of the fuel cell stack 10. A corresponding phenomenon may also occur in the anode operating medium and, in particular, in the coolant, i.e., in the anode inlet channel and coolant inlet channel not shown here.

In order to counter the problem of sedimentation and obstruction by particles, the present invention provides that means for retaining particles be provided and arranged in at least one of the main supply channels 17, 18—in particular, in one of the supplying main supply channels 17. Examples in this regard are illustrated in FIGS. 5 and 6 using a detailed view of a fuel cell stack 10 according to the invention. In this view, only a lower section of the fuel cell stack 10 and of the downstream end plate 16 are shown.

In the exemplary embodiment shown in FIG. 5, the means 40 for retaining particles 191 according to the invention comprise a cavity (pocket) 41, which is arranged in a downstream end of the supplying main supply channel 17. The cavity 41 is, in particular, designed in the form of a recess of the downstream end plate 16. In this case, the recess 41 is arranged on a radial circumference of the channel 17 in relation to an axial extension of the main supply channel 17—in particular, in accordance with the installation location of the stack 10, on a lower side of the channel 17. Particles 191 entering the channel 17 together with the operating medium 19 are decelerated on the downstream end plate 16, lose kinetic energy, and accumulate in the recess 41. At this location, the sediment does not result in any blockage or obstruction of the fine inlet channels into the individual cells 11 of the stack 10 extending above the main supply channel 17. The volume of the recess/cavity 41 is preferably dimensioned such that it is enough to receive the entire sediment volume to be expected for the service life of the fuel cell 10.

The cavity 41 may optionally be connected to an outlet channel into the surrounding environment—preferably, however, into the respective discharging main supply channel 18—while bypassing the active areas of the individual cells (not shown in FIG. 5). In this way, a small portion of the operating medium flow through the recess 41 arrives via the outlet channel directly in the discharging channel 18, while bypassing the cells 11. This outlet channel preferably runs through the end plate 16. On the one hand, such an outlet channel improves the targeted accumulation of the particles 191 in the recess 41, since they are transported in a targeted manner via the bypass flow into the recess 41. Furthermore, a certain increase in the storage capacity for the sediments may be achieved by means of the outlet channel.

FIG. 6 shows an alternative embodiment of the fuel cell stack 10 according to the invention. According to this embodiment, the means 40 for retaining particles have protrusions 42, which project into the main supply channel 17. In the example illustrated, the protrusions 42 are formed by the membrane electrode assemblies 14. The protrusions 42 are, in particular, produced by the respective supply openings 144, 146, 148 of the membrane electrode assembly 14 (see FIG. 2) being designed to be slightly smaller than the corresponding supply openings 154, 156, and 158 of the bipolar plate 15 (see FIG. 3). For example, the membrane electrode assembly 14 may be substantially formed in the respective inactive area IA exclusively by the support film, so that the latter also forms the protrusions 42. In an alternative embodiment, the protrusions 42 may also be formed by correspondingly smaller supply openings of the bipolar plate 14. Between two protrusions 42 each, a cavity 43 receiving the particles 191 is thus respectively formed. The height of the protrusions 42 or the depths of the cavities 43 may be in the range of 0.1 to 5 mm—in particular, in the range of 0.3 to 2 mm, and, preferably, in the range of 0.5 to 1.0 mm.

In this exemplary embodiment, since the main supply channel 17 extends below the active areas AA of the individual cells 11 according to the installation location of the fuel cell stack 10, and since the operating medium 19 thus flows into the individual cells 11 from below, no blockage of the individual cells 11 occurs as a result of the particles 191 accumulated in the pockets 43.

In the exemplary embodiment shown, the protrusions 42 and cavities 43 extend over the entire extent of the main supply channel 17. This allows for the use of uniformly-cut membrane electrode assemblies 14 for the entire stack 10. Moreover, a particularly high retention level and storage capacity for the particles 191 is achieved in this way. However, appropriate protrusions 42 and cavities 43 may, alternatively, also be arranged in a targeted manner only in predetermined sections of the channel 17. In yet another embodiment, special "collecting cells" may be provided between the regular individual fuel cells 11, which "collecting cells" are arranged between two protrusions 42 and are exclusively used to receive particles 191. In the process, the collecting cells may have a larger layer thickness than the individual fuel cells 11, in order to provide a correspondingly large storage volume in the cavities 43.

The exemplary embodiments shown in FIGS. 5 and 6 may also be used particularly advantageously in combination with each other.

The integrated arrangement of the means 40 for retaining particles according to the invention in the fuel cell stack 10 results in a reduction in the installation volume and the complexity of the fuel cell system 100, since a separate purification device for the operating medium—in particular, a particle filter—may be dispensed with. A pressure drop, as a result of clog-producing supply channel structures in the individual cells 11, can be effectively prevented. The filtration effect can, possibly, even be improved, compared to separate particle filters. The structural means for implementing the invention are associated with extremely low effort, so that a cost advantage also arises.

LIST OF REFERENCE SYMBOLS

100 Fuel cell system
10 Fuel cell stack
11 Individual cell
12 Anode chamber
13 Cathode chamber
14 Membrane electrode assembly (MEA)
141 Anode side
142 Cathode side
143 Catalytic electrode/anode
144 Supply opening/anode inlet opening
145 Supply opening/anode outlet opening
146 Supply opening/cathode inlet opening
147 Supply opening/cathode outlet opening
148 Supply opening/coolant inlet opening
149 Supply opening/coolant outlet opening
15 Bipolar plate (separator plate, flow field plate)
151 Anode side
152 Cathode side
153 Operating medium channel (reactant channel)
154 Supply opening/anode inlet opening
155 Supply opening/anode outlet opening
156 Supply opening/cathode inlet opening
157 Supply opening/cathode outlet opening
158 Supply opening/coolant inlet opening
159 Supply opening/coolant outlet opening
16 End plate/media supply plate/downstream plate
17 Main supply channel/cathode inlet channel
18 Main supply channel/cathode outlet channel
19 Operating medium/cathode operating medium/air
191 Particles/particulate contamination
20 Anode supply
21 Anode supply path
22 Anode exhaust path
23 Fuel tank
24 Adjusting means
25 Fuel recirculation line
26 Adjusting means
30 Cathode supply
31 Cathode supply path
32 Cathode exhaust path
33 Compressor
34 Electric motor
35 Power electronics
36 Turbine
37 Wastegate line
38 Adjusting means
39 Humidifier module
40 Means for retaining particles
41 Cavity/recess
42 Protrusion
43 Cavity
AA Active area (reaction area)
IA Inactive area
SA Supply area
DA Distribution area
S Stacking direction

The invention claimed is:

1. A fuel cell stack comprising:
a stack of membrane electrode assemblies and bipolar plates arranged in alternation in a stacking direction between two end plates; and
main supply channels for supplying and discharging operating media for the fuel cell stack, the main supply channels extending through the fuel cell stack in the stacking direction, wherein a cavity for receiving particles is formed in a downstream end plate of the fuel cell stack and in at least one main supply channel of the main supply channels.

2. The fuel cell stack according to claim 1, wherein the at least one main supply channel in which the cavity for receiving particles is formed in a main supply channel for supplying operating media.

3. The fuel cell stack according to claim 2, wherein the at least one of the main supply channels in which the cavity for receiving particles is formed in a cathode inlet channel, a coolant inlet channel, or both.

4. The fuel cell stack according to claim 1, wherein the main supply channels for supplying and discharging operating media run substantially horizontally, wherein the at least one main supply channel having the cavity for receiving particles is arranged below or laterally adjacent to an inlet area of an active areas of the membrane electrode assemblies, said inlet area communicating with the at least one main supply channel.

5. The fuel cell stack according to claim 1, wherein the cavity for receiving particles comprises at least one recess arranged radially in relation to an extension of the at least one main supply channel.

6. A vehicle with a fuel cell system comprising a fuel cell stack including:
a stack of membrane electrode assemblies and bipolar plates arranged in alternation in a stacking direction between two end plates; and
main supply channels for supplying and discharging operating media for the fuel cell stack, the main supply channels extending through the fuel cell stack in the stacking direction, wherein a cavity for receiving particles is formed in a downstream end plate of the fuel cell stack and in at least one main supply channel of the main supply channels.

7. The vehicle according to claim 6, wherein the cavity for receiving particles comprises at least one recess arranged radially in relation to an extension of the at least one main supply channel.

8. A fuel cell stack comprising:
a plurality of alternating membrane electrode assemblies and bipolar plates arranged in a first direction between a first end plate and a second end plate, the second end plate being a downstream endplate with respect to the first direction;
a plurality of main supply channels extending through the fuel cell stack in the first direction; and
at least one cavity for receiving particles formed in the downstream end plate and in a main supply channel of the plurality of main supply channels.

9. The fuel cell stack according to claim 8, wherein the cavity for receiving particles is arranged radially in relation to an extension of the main supply channel.

* * * * *